(12) United States Patent
Chan et al.

(10) Patent No.: US 9,678,735 B2
(45) Date of Patent: Jun. 13, 2017

(54) DATA CACHING AMONG INTERCONNECTED DEVICES

(71) Applicant: NEXTBIT SYSTEMS INC., San Francisco, CA (US)

(72) Inventors: Michael A. Chan, San Francisco, CA (US); Tom Moss, Los Altos, CA (US); Daniel Reuben Bornstein, San Francisco, CA (US); Michael K. Fleming, San Francisco, CA (US); Justin Quan, San Francisco, CA (US); Linda Tong, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 347 days.

(21) Appl. No.: 14/042,452

(22) Filed: Sep. 30, 2013

(65) Prior Publication Data
US 2014/0095646 A1    Apr. 3, 2014

Related U.S. Application Data

(60) Provisional application No. 61/708,794, filed on Oct. 2, 2012.

(51) Int. Cl.
*H04L 29/08* (2006.01)
*G06F 9/445* (2006.01)
(Continued)

(52) U.S. Cl.
CPC ............. *G06F 8/62* (2013.01); *G06F 8/63* (2013.01); *G06F 9/4406* (2013.01);
(Continued)

(58) Field of Classification Search
CPC ......... H04L 41/00; H04L 43/00; H04L 51/00; H04L 61/00; H04L 65/00; H04L 67/00;
(Continued)

(56) References Cited

U.S. PATENT DOCUMENTS 5,446,901 A    8/1995 Owicki et al.
5,925,100 A    7/1999 Drewry et al.
(Continued)

FOREIGN PATENT DOCUMENTS

CN    101692239 A    4/2010
WO    WO2013137917    *    9/2013    ............... G06F 9/06

OTHER PUBLICATIONS

Co-Pending U.S. Appl. No. 14/248,219 of Chan, M.A. et al., filed Apr. 8, 2014.
(Continued)

*Primary Examiner* — Kostas Katsikis
*Assistant Examiner* — Billy H Ng
(74) *Attorney, Agent, or Firm* — Mattingly & Malur, PC

(57) ABSTRACT

Technology is disclosed herein for optimizing data caches among multiple interconnected computing devices. According to at least one embodiment, a storage server transfers a first data set to a computing device. The storage server then identifies a neighbor computing device sharing a local area network (LAN) with the computing device. The neighbor computing device maintains a network connection with the storage server. The storage server transmits a second data set relevant to the first data set to the neighbor computing device. In response to a read request for the second data set from the computing device, the storage server sends to the computing device an instruction indicating that the neighbor computing device is storing a data cache for the computing device.

18 Claims, 9 Drawing Sheets

(51) Int. Cl.
*G06F 17/30* (2006.01)
*H04L 29/06* (2006.01)
*H04L 12/26* (2006.01)
*H04L 9/08* (2006.01)
*H04L 9/32* (2006.01)
*G06F 9/44* (2006.01)
*H04W 8/24* (2009.01)

(52) U.S. Cl.
CPC ........ *G06F 9/4416* (2013.01); *G06F 17/3007* (2013.01); *G06F 17/3015* (2013.01); *G06F 17/30085* (2013.01); *G06F 17/30091* (2013.01); *G06F 17/30194* (2013.01); *H04L 9/0825* (2013.01); *H04L 9/3226* (2013.01); *H04L 43/04* (2013.01); *H04L 65/4069* (2013.01); *H04L 65/60* (2013.01); *H04L 67/10* (2013.01); *H04L 67/1095* (2013.01); *H04L 67/1097* (2013.01); *H04L 67/2823* (2013.01); *H04L 67/2842* (2013.01); *H04L 67/40* (2013.01); *H04L 67/42* (2013.01); *H04W 8/24* (2013.01); *G06F 17/30011* (2013.01); *G06F 17/30286* (2013.01); *Y02B 60/188* (2013.01)

(58) Field of Classification Search
CPC . H04L 69/00; H04L 67/2842; H04L 67/1097; H04L 65/60; H04L 67/2823; H04L 67/40; H04L 9/3226; H04L 67/42; H04L 67/10; H04L 43/04; H04L 67/1095; H04L 9/0825; H04L 65/4069; H04L 29/08; H04L 49/103; H04L 49/108; G06F 17/30085; G06F 17/3015; G06F 17/3007; G06F 17/30194; G06F 9/4406; G06F 9/4416; G06F 8/62; G06F 8/63; G06F 17/30091; G06F 17/30011; G06F 17/30286; G06F 11/2043; G06F 15/167; G06F 9/546; H04W 8/24; Y02B 60/188
See application file for complete search history.

(56) References Cited

U.S. PATENT DOCUMENTS

| | | | |
|---|---|---|---|
| 6,085,226 A | 7/2000 | Horvitz | |
| 6,286,080 B1 | 9/2001 | Galbraith et al. | |
| 6,385,641 B1 | 5/2002 | Jiang et al. | |
| 6,412,021 B1 | 6/2002 | Nguyen et al. | |
| 6,721,870 B1 | 4/2004 | Yochai et al. | |
| 6,757,696 B2 | 6/2004 | Multer et al. | |
| 6,877,065 B2 | 4/2005 | Galbraith et al. | |
| 6,918,113 B2 | 7/2005 | Patel et al. | |
| 6,944,819 B2 | 9/2005 | Banatwala et al. | |
| 6,959,320 B2 | 10/2005 | Shah et al. | |
| 7,043,524 B2 | 5/2006 | Shah et al. | |
| 7,062,567 B2 | 6/2006 | Benitez et al. | |
| 7,072,914 B2 | 7/2006 | Cabrera et al. | |
| 7,124,272 B1 | 10/2006 | Kennedy et al. | |
| 7,130,866 B2 | 10/2006 | Schaffer | |
| 7,139,811 B2* | 11/2006 | Lev Ran | G06F 9/546 707/999.01 |
| 7,155,465 B2 | 12/2006 | Lee et al. | |
| 7,222,186 B2 | 5/2007 | Kobayashi | |
| 7,260,672 B2 | 8/2007 | Garney | |
| 7,451,225 B1* | 11/2008 | Todd | G06F 12/0862 709/229 |
| 7,506,317 B2 | 3/2009 | Liang et al. | |
| 7,533,230 B2 | 5/2009 | Glover et al. | |
| 7,617,250 B2 | 11/2009 | Xu et al. | |
| 7,676,630 B2 | 3/2010 | Qiao | |
| 7,685,255 B2 | 3/2010 | Amlekar et al. | |
| 7,698,517 B2 | 4/2010 | Tulyani | |
| 7,783,666 B1 | 8/2010 | Zhuge et al. | |
| 7,792,792 B2 | 9/2010 | Witriol et al. | |
| 7,805,531 B2 | 9/2010 | Groll et al. | |
| 7,849,307 B2 | 12/2010 | Roskind | |
| 7,882,304 B2 | 2/2011 | English et al. | |
| 7,917,494 B2 | 3/2011 | Muller | |
| 8,019,811 B1 | 9/2011 | Britto et al. | |
| 8,082,292 B2 | 12/2011 | Karmakar et al. | |
| 8,136,089 B2 | 3/2012 | Snodgrass et al. | |
| 8,160,573 B2 | 4/2012 | Griffith et al. | |
| 8,214,594 B1 | 7/2012 | Kneisley et al. | |
| 8,245,012 B2 | 8/2012 | Krauss | |
| 8,312,102 B2 | 11/2012 | Grinberg | |
| 8,326,793 B1 | 12/2012 | Bowers et al. | |
| 8,386,425 B1* | 2/2013 | Kadayam | H04L 67/1095 707/613 |
| 8,438,298 B2 | 5/2013 | Arai et al. | |
| 8,456,972 B2 | 6/2013 | Mehra et al. | |
| 8,539,163 B1 | 9/2013 | Sivasubramanian et al. | |
| 8,566,788 B2 | 10/2013 | Snodgrass et al. | |
| 8,635,219 B2 | 1/2014 | Chakra et al. | |
| 8,706,755 B2 | 4/2014 | Patel et al. | |
| 8,732,406 B1 | 5/2014 | Pase et al. | |
| 8,756,620 B2 | 6/2014 | Papish et al. | |
| 8,769,210 B2 | 7/2014 | Bell, Jr. et al. | |
| 8,775,487 B2 | 7/2014 | Uhrhane et al. | |
| 8,788,628 B1 | 7/2014 | Taylor et al. | |
| 8,805,406 B1 | 8/2014 | Casaburi et al. | |
| 8,831,352 B2 | 9/2014 | Gao et al. | |
| 8,954,730 B2 | 2/2015 | Roskind | |
| 8,972,690 B2 | 3/2015 | Horn et al. | |
| 9,014,736 B2 | 4/2015 | Hart | |
| 9,052,826 B2 | 6/2015 | Quan et al. | |
| 9,426,230 B2 | 8/2016 | Anderson | |
| 2002/0083183 A1 | 6/2002 | Pujare et al. | |
| 2002/0133537 A1 | 9/2002 | Lau et al. | |
| 2002/0184403 A1* | 12/2002 | Dahlin | G06F 12/121 719/316 |
| 2003/0154116 A1 | 8/2003 | Lofton | |
| 2003/0200282 A1 | 10/2003 | Arnold et al. | |
| 2004/0205633 A1 | 10/2004 | Martinez et al. | |
| 2005/0097268 A1 | 5/2005 | Vollmer | |
| 2005/0240875 A1 | 10/2005 | Takayama et al. | |
| 2006/0223495 A1 | 10/2006 | Cassett et al. | |
| 2006/0264197 A1 | 11/2006 | Mahini et al. | |
| 2006/0277271 A1 | 12/2006 | Morse et al. | |
| 2007/0067382 A1 | 3/2007 | Sun | |
| 2007/0078770 A1 | 4/2007 | Hsieh | |
| 2007/0195692 A1* | 8/2007 | Hagglund | G06F 11/2058 370/216 |
| 2007/0240065 A1 | 10/2007 | Alperin et al. | |
| 2007/0245110 A1* | 10/2007 | Shibayama | G06F 3/0605 711/165 |
| 2007/0288247 A1* | 12/2007 | Mackay | G06Q 10/00 705/1.1 |
| 2008/0071988 A1 | 3/2008 | Schloter et al. | |
| 2008/0140997 A1 | 6/2008 | Tripathi | |
| 2008/0177803 A1 | 7/2008 | Fineberg et al. | |
| 2008/0178298 A1 | 7/2008 | Arai et al. | |
| 2008/0183903 A1 | 7/2008 | VanStee et al. | |
| 2008/0196065 A1 | 8/2008 | Cheng et al. | |
| 2008/0250024 A1 | 10/2008 | Kim et al. | |
| 2008/0293488 A1 | 11/2008 | Cheng et al. | |
| 2009/0144283 A1 | 6/2009 | Clark et al. | |
| 2009/0287842 A1* | 11/2009 | Plamondon | H04L 12/4641 709/233 |
| 2010/0036858 A1 | 2/2010 | Patel | |
| 2010/0088369 A1 | 4/2010 | Sebastian et al. | |
| 2010/0115211 A1 | 5/2010 | de la Iglesia et al. | |
| 2010/0138613 A1 | 6/2010 | Parker | |
| 2010/0191783 A1 | 7/2010 | Mason et al. | |
| 2010/0306652 A1 | 12/2010 | Bolger et al. | |
| 2010/0325199 A1 | 12/2010 | Park et al. | |
| 2011/0087690 A1 | 4/2011 | Cairns | |
| 2011/0213994 A1* | 9/2011 | Thereska | G06F 1/3221 713/320 |
| 2011/0306304 A1 | 12/2011 | Forutanpour et al. | |
| 2011/0320558 A1 | 12/2011 | Gross et al. | |
| 2012/0078727 A1 | 3/2012 | Lee | |
| 2012/0084151 A1 | 4/2012 | Kozak et al. | |
| 2012/0084348 A1 | 4/2012 | Lee et al. | |

(56) References Cited

U.S. PATENT DOCUMENTS

| | | |
|---|---|---|
| 2012/0084349 A1 | 4/2012 | Lee et al. |
| 2012/0094594 A1 | 4/2012 | Rofougaran et al. |
| 2012/0151255 A1 | 6/2012 | Lee et al. |
| 2012/0259849 A1 | 10/2012 | Deodhar et al. |
| 2012/0303896 A1 | 11/2012 | McGroddy-Goetz et al. |
| 2013/0031204 A1 | 1/2013 | Graham et al. |
| 2013/0067168 A1 | 3/2013 | Havewala et al. |
| 2013/0174046 A1 | 7/2013 | Lim et al. |
| 2013/0185258 A1 | 7/2013 | Bestler et al. |
| 2013/0210527 A1 | 8/2013 | Kim et al. |
| 2013/0254326 A1 | 9/2013 | Weng et al. |
| 2013/0318306 A1 | 11/2013 | Gonion |
| 2013/0330497 A1 | 12/2013 | Villata |
| 2013/0339407 A1 | 12/2013 | Sharpe et al. |
| 2014/0006538 A1 | 1/2014 | Oikonomou |
| 2014/0040346 A1* | 2/2014 | Yanagihara ....... G06F 17/30902 709/203 |
| 2014/0066176 A1 | 3/2014 | LeTourneau et al. |
| 2014/0101106 A1 | 4/2014 | Lee et al. |
| 2015/0052178 A1 | 2/2015 | Zhong |
| 2015/0208205 A1 | 7/2015 | Chan et al. |
| 2015/0365491 A1 | 12/2015 | Chan et al. |

OTHER PUBLICATIONS

Co-Pending U.S. Appl. No. 14/271,738 of Chan, M.A. et al., filed May 7, 2014.
Notice of Allowance mailed May 5, 2014, for U.S. Appl. No. 14/171,679 by Chan, M.A. et al., filed Feb. 3, 2014.
Non-Final Office Action mailed Jun. 16, 2014, for U.S. Appl. No. 14/180,021 of Chan, M.A. et al., filed Feb. 13, 2014.
Non-Final Office Action mailed Oct. 9, 2014, for U.S. Appl. No. 14/271,738 of Chan, M.A. et al., filed May 7, 2014.
Final Office Action mailed Dec. 5, 2014, for U.S. Appl. No. 14/180,021 of Chan, M.A. et al., filed Feb. 13, 2014.
Co-Pending U.S. Appl. No. 14/043,693 by Chan, M.A. et al., filed Oct. 1, 2013.
Co-Pending U.S. Appl. No. 14/043,082 by Chan, M.A. et al., filed Oct. 1, 2013.
Co-Pending U.S. Appl. No. 14/155,067 by Chan, M.A. et al., filed Jan. 14, 2014.
Co-Pending U.S. Appl. No. 14/171,679 by Chan, M.A. et al., filed Feb. 3, 2014.
International Search Report and Written Opinion mailed Jan. 22, 2014, 10 pp., for International Application No. PCT/US2013/063003 filed Oct. 2, 2013.
Co-Pending U.S. Appl. No. 14/180,021 by Chan, M.A., et al., filed Feb. 13, 2014.
Notice of Allowance mailed Mar. 31, 2014, for U.S. Appl. No. 14/155,067 by Chan, M.A. et al., filed Jan. 14, 2014.
Non-Final Office Action mailed Apr. 4, 2014, for U.S. Appl. No. 14/171,679 by Chan, M.A. et al., filed Feb. 3, 2014.
Final Office Action mailed Apr. 20, 2015, for U.S. Appl. No. 14/271,738 by Chan, M.A., et al., filed May 7, 2014.
Non-Final Office Action mailed Jul. 21, 2015, for U.S. Appl. No. 14/043,693 by Chan, M.A., et al., filed Oct. 1, 2013.
Non-Final Office Action mailed Aug. 10, 2015, for U.S. Appl. No. 14/180,021 by Chan, M.A., et al., filed Feb. 13, 2014.
Non-Final Office Action mailed Nov. 25, 2015, for U.S. Appl. No. 14/271,738 by Chan, M.A., et al., filed May 7, 2014.
Non-Final Office Action mailed Mar. 9, 2016, for U.S Appl. No. 14/180,021 by Chan, M.A., et al., filed Feb. 13, 2014.
Final Office Action mailed Mar. 10, 2016, for U.S. Appl. No. 14/043,693 by Chan, M.A., et al., filed Oct. 1, 2013.
Non-Final Office Action mailed Mar. 25, 2016, for U.S Appl. No. 14/248,219 by Chan, M.A., et al., filed Apr. 8, 2014.
Non-Final Office Action mailed Aug. 25, 2016, for U.S. Appl. No. 14/180,021 by Chan, M.A., et al., filed Feb. 13, 2014.
Non-Final Office Action mailed Sep. 2, 2016, for U.S Appl. No. 14/043,082 by Chan, M.A., et al., filed Oct. 1, 2013.
Non-Final Office Action mailed Nov. 2, 2016, for U.S. Appl. No. 14/043,693 by Chan, M.A., et al., filed Oct. 1, 2013.
Non-Final Office Action mailed Nov. 17, 2016, for U.S. Appl. No. 14/674,048 by Chan, M.A., et al., filed Mar. 31, 2015.

* cited by examiner

DATA CACHING AMONG INTERCONNECTED DEVICES

PRIORITY CLAIM

This application claims to the benefit of U.S. Provisional Patent Application No. 61/708,794, entitled "CLOUD COMPUTING INTEGRATED OPERATING SYSTEM", which was filed on Oct. 2, 2012, which is incorporated by reference herein in its entirety.

FIELD OF THE INVENTION

At least one embodiment of the present invention pertains to mobile devices, and more particularly, to mobile devices using other connected devices to cache data for optimizing network data transmission.

BACKGROUND

The internet has become a universal platform for web communications. Technologies for optimizing web delivery of content have been developed. Various delivery methods are available as they rely on standard web servers that are widely supported. For instance, a content server for a content delivery network can break a media stream into small fragments and transfer the fragments to client devices. The client devices download the files and play the fragments in an order specified by the content server. When too many client devices request data from the content server at the same time, the existing bandwidth and system resources of the content server can be overwhelmed.

A content delivery network may include edge servers that are connected to the content server to mitigate the problem. The edge servers can aggregate requests by multiplexing connections from the client devices to one connection between each edge server and the content server. The edge servers can receive corresponding requested data from the server. In response to download requests from the client devices, the edge servers relay the corresponding requested data to the client devices. The edge servers can further cache the data such that cached data can be made available to further data requests from client devices connected to the edge servers.

However, just like the connection limitation between the content server and a client device, there may be a connection limitation between the edge server and the client device as well. Various factors can limit the bandwidth for the client device to download data from the edge server. For instance, the client device may connect to the Internet via a network provider with a data transferring speed upper limit. Therefore the maximum download speed from the edge server to the client device is limited by the speed upper limit.

SUMMARY

Technology introduced herein provides a mechanism to optimize data cache among multiple interconnected computing devices. According to at least one embodiment, a storage server transfers a first data set to a computing device. The storage server then identifies a neighbor computing device sharing a local area network (LAN) with the computing device. The neighbor computing device maintains a network connection with the storage server. The storage server transmits a second data set relevant to the first data set to the neighbor computing device. In response to a read request for the second data set, the storage server sends to the computing device an instruction indicating that the neighbor computing device stores a data cache for the computing device. The neighbor computing device serves as a cache device for the computing device. Because the network connection bandwidth between the neighbor computing device and the computing device is a local area network bandwidth and therefore higher than the connection bandwidth for the outside storage server, the computing device is able to retrieve the pre-cached relevant data sets in a higher data transfer rate, in comparison to retrieving all data directly from the storage server.

In accordance with the techniques introduced here, therefore, a computing device is provided. The computing device includes a networking component, a storage component, a process, and a memory. The networking component is configured to communicate with a second computing device. The computing device and the second computing device are interconnected within a local area network (LAN). The network component is further configured to communicate with a storage server outside of the LAN. The memory stores instructions which, when executed by the processor, cause the computing device to perform a process for caching data among devices within the local area network. The process includes steps of retrieving data from the storage server via the networking component, storing the data in the storage component as cache data for the second computing device, receiving a cache inquiry for the cache data stored in the storage component from the second computing device, and transferring the cache data to the second computing device in response to the cache inquiry.

In accordance with the techniques introduced here, therefore, a storage server is provided also. The storage server includes a networking component, a storage component, a process, and a memory. The networking component is configured to communicate with a first computing device and a second computing device. The first computing device and the second computing device are interconnected within a local area network (LAN). The memory stores instructions which, when executed by the processor, cause the storage server to perform a process for caching data among devices within the local area network. The process includes steps of transferring the first data set stored in the storage component to the first computing device in response to a read request for a first data set from the first computing device, identifying a second data set relevant to the first data set, transferring the second data set to the second computing device as cache data for the first computing device, and sending an instruction to the first computing device to retrieve the second data set directly from the second computing device in response to a read request for the second data set from the first computing device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
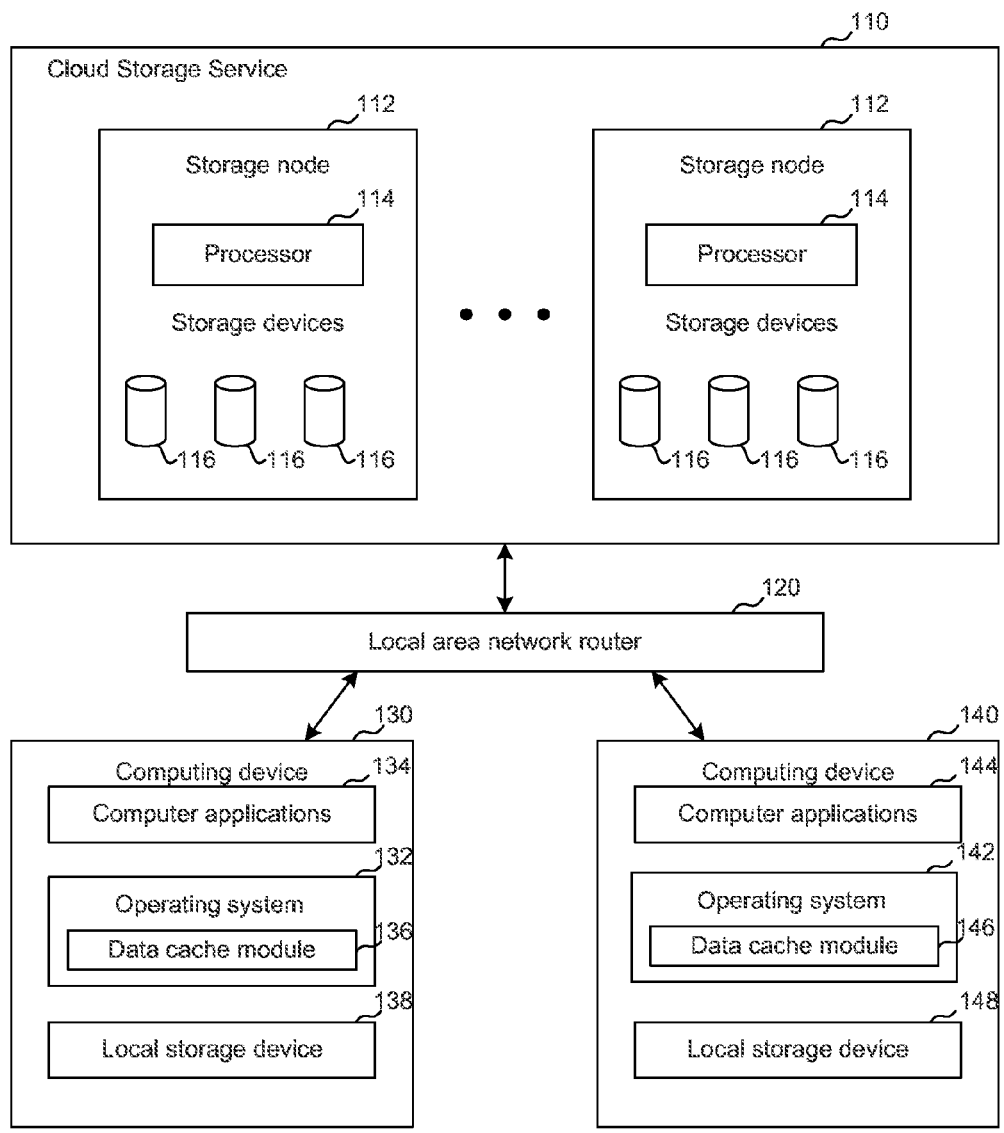
FIG. 1 illustrates an example system for computing devices in a local area network (LAN) connected to a cloud storage service.

FIG. 1 illustrates an example system for computing devices in a local area network (LAN) connected to a cloud storage service. The system includes a cloud storage service 110 configured to communicate with the computing devices. In one embodiment, the cloud storage service 110 can be a server cluster having computer nodes interconnected with each other by a network. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A local area network router 120 can also be included to exchange data between the computing device and cloud storage server 110. The local area network router 120 can include network communication hardware and network connection logic to receive the information from computing devices. The local area network router 120 may include a queuing mechanism to organize data received from or sent to the computing devices 130 and 140.

The computing devices 130 and 140 can each communicate with the cloud storage service 110 via the local area network router 120. The computing devices 130 and 140 form a local area network. The local area network router 120 is responsible for data communication transmitted out of and into the local area network. In some embodiments, the bandwidth of the connection between the computing devices 130 and 140 is larger than the bandwidth of the connections between the cloud storage service 110 and the computing devices.

Although FIG. 1 illustrates two computing devices 130 and 140, a person having ordinary skill in the art will readily understand that the technology disclosed herein can be applied to a single computing device or more than two computing devices connected to the cloud storage service 110.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a data cache module 136 to manage data cache for the computing device 130 and other computing devices in the local area network. The computer applications 134 can request data from the cloud storage service 110. Instead of downloading the requested data directly from the cloud storage service 110, the data cache module 136 can inquire the cloud storage service 110 for any data cache in the local area network. If the cloud storage service 110 replies that there is another computing device (e.g. computing device 140) that stored the requested data in its cache, the data cache module 136 can download the request data from the computing device in the same local area network, and take advantage of the high bandwidth of the local area network.

Similarly, the data cache module 136 can also cache data for other computing devices in the local area network. For instance, in response to an instruction of the cloud storage service 110, the data cache module 136 can cache data for the computing device 140. If the data cache module 146 of the computing device 140 sends a data request to the computing device 130, the data cache module 136 can identify the requested data and transfer the data to the computing device 140.

The computer applications 134 running on the same computing device 130 need not be aware of the location of the cached data. The computer applications 134 may communicate directly with the operating system 132 to fetch local data, and the operating system may generate a request that targets the cloud storage service 110 if the data file does not exist in the data cache module 136. Alternatively, the computer applications 134 may generate a data request targeting the cloud storage service 110. The data cache module 136, as a part of the operating system 132, can be responsible for locating the cached data by communicating with the cloud storage service 110 and retrieving the data from the cached location.

Figure 2:
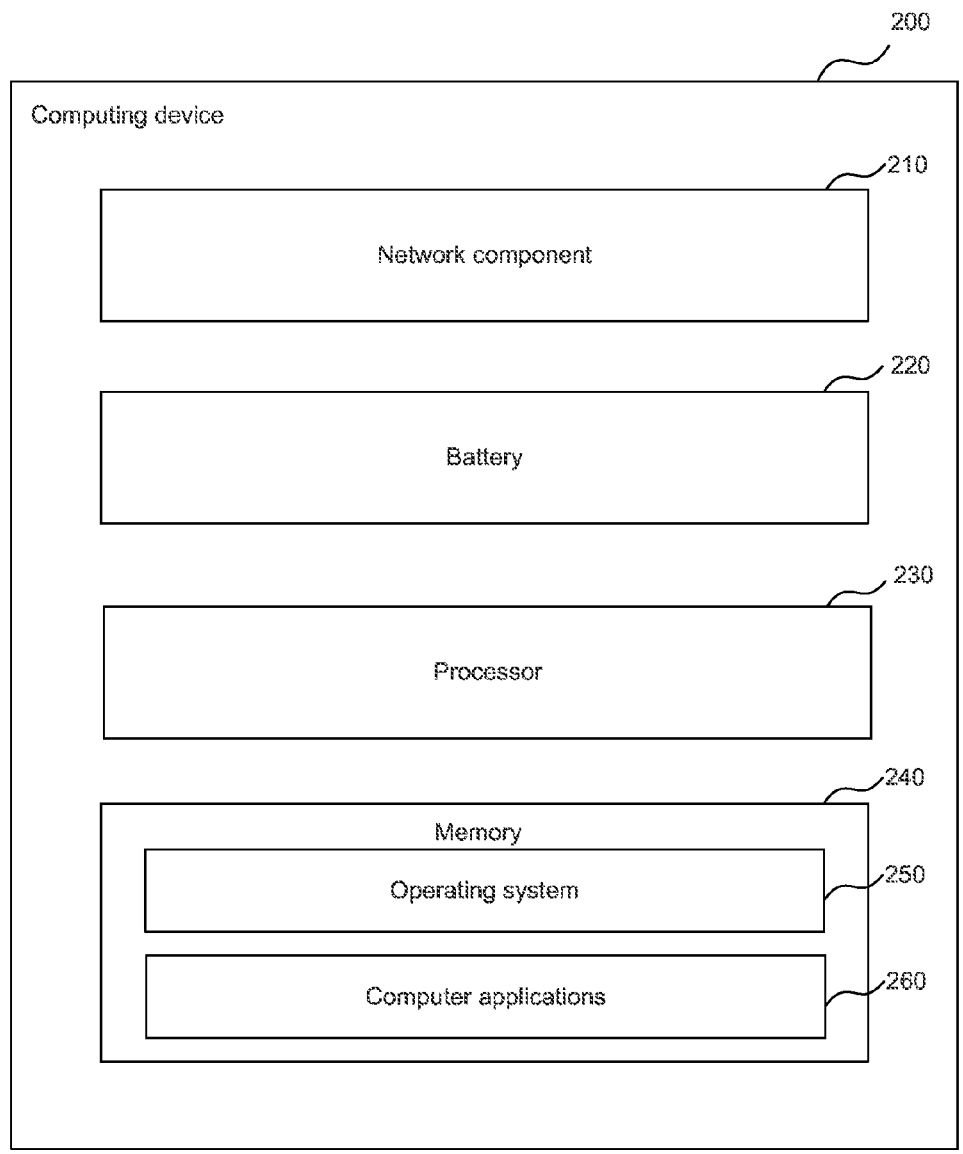
FIG. 2 illustrates an example of a computing device that can communicate with a cloud storage server.

FIG. 2 illustrates an example of a computing device that can communicate with a cloud storage server, according to one embodiment. The computing device 200 can include a networking component 210, a battery 220, a processor 230 and memory component 240. The memory component 240 can store instructions of an operating system 250 of the computing device 200. The memory component 240 can further store instructions of one or more computer applications 260 designed to run at the computing device 200.

The networking component 210 can be capable of switching between states including a high power consumption state and a low power conservation state. The network component 210 can be, e.g. a WiFi networking adapter, a cellular phone networking adapter, or a combination thereof. The battery 220 is configured to provide power to the networking component and other components of the computing device 200. The computing device may further include a power adapter to be connected to a power source to provide power for the computing device 200, in addition to the power provided by the battery 220.

The processor 230 is configured to run computer applications 260 and the operating system 250 of the computing device 200. The memory component 240 stores instructions of the operating system 250 which, when executed by the processor 230, cause the operating system 250 to perform processes for realizing certain functionalities of the computing device 200.

For instance, the process of the operating system 250 can receive requests for data from the computer applications 260. The applications 260 can generate the requests for data as if the data are stored in the computing device 200. The applications 260 does not need to know that the cloud storage service exists. The process of the operating system 250 can further redirect its request to another computing device having cached data within the same local area network in response to an instruction from the storage server. The computer applications 260 do not need to be aware of the location of the cached data. The computer applications 260 can perform as if the requested data are transferred directly from the operating system 250, instead of the storage server. The operating system 250 running behind the computer applications 260 is responsible for locating and retrieving the requested data from a data cache of another computing device in the local area network.

In some embodiments, the computing device can serve as a data cache device with a high power efficiency for other computing devices in the same local area network. For instance, the computing device 200 can stay at a low power conservation state initially. When the storage server sends an instruction to the computing device 200 to retrieve and store cache data for another computing device, the computing device 200 switches to a high power consumption state and retrieves the cache data. The computing device 200 can again switch back to the low power conservation state after retrieving the cache data. When another computing device contacts the computing device 200 for retrieving the cache data, the computing device 200 switches to the high power consumption state to handle the data request. In this way, the battery power and the network connection of computing device 200 are optimized and utilized in a more efficient way. As a result, the battery life of the computing device 200 can be extended.

Figure 3:
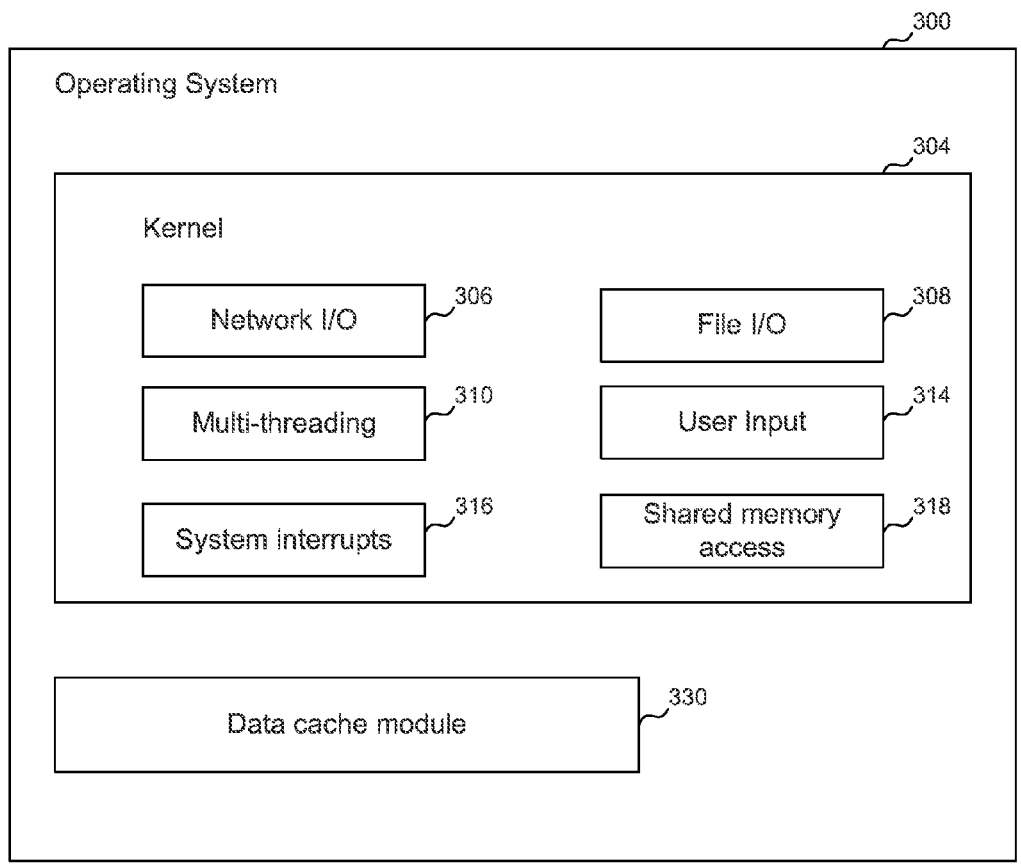
FIG. 3 illustrates an example operating system of a computing device for multiple-device caching.

FIG. 3 illustrates an example operating system of a computing device for multiple-device caching, according to one embodiment. The operating system 300 includes a kernel 304. The kernel 304 provides interfaces to hardware of the electronic device for the computer applications running on top of the kernel 304, and supervises and controls the computer applications. The kernel 304 isolates the computer applications from the hardware. The kernel 304 may include one or more intervening sources that can affect execution of a computer application. In one embodiment, the kernel 304 includes a network I/O module 306, a file I/O module 308, multi-threading module 310, user input 314, system interrupts 316, and shared memory access 318.

A data cache module 330 runs on top of the kernel 304. The data cache module 330 is responsible for caching data for other devices and retrieving cache data for this device. For instance, the data cache module 330 can maintain a network connection with a storage server. When the storage server instructs the data cache module 330 to store certain cache data for another device, the data cache module 330 retrieves the cache data from the storage server. When another device in the same local area network requests the cache data, the data cache module 330 sends the cache data to the other device.

The data cache module 330 is also responsible for retrieving data cached in another device. The data cache module 330 can first send the data request to the storage server. If the storage server replies that the requested data is cached in another device in the same local area network as the device, the data cache module 330 retrieves the cached data from the other device, instead of the storage server outside of the local area network.

Figure 4:
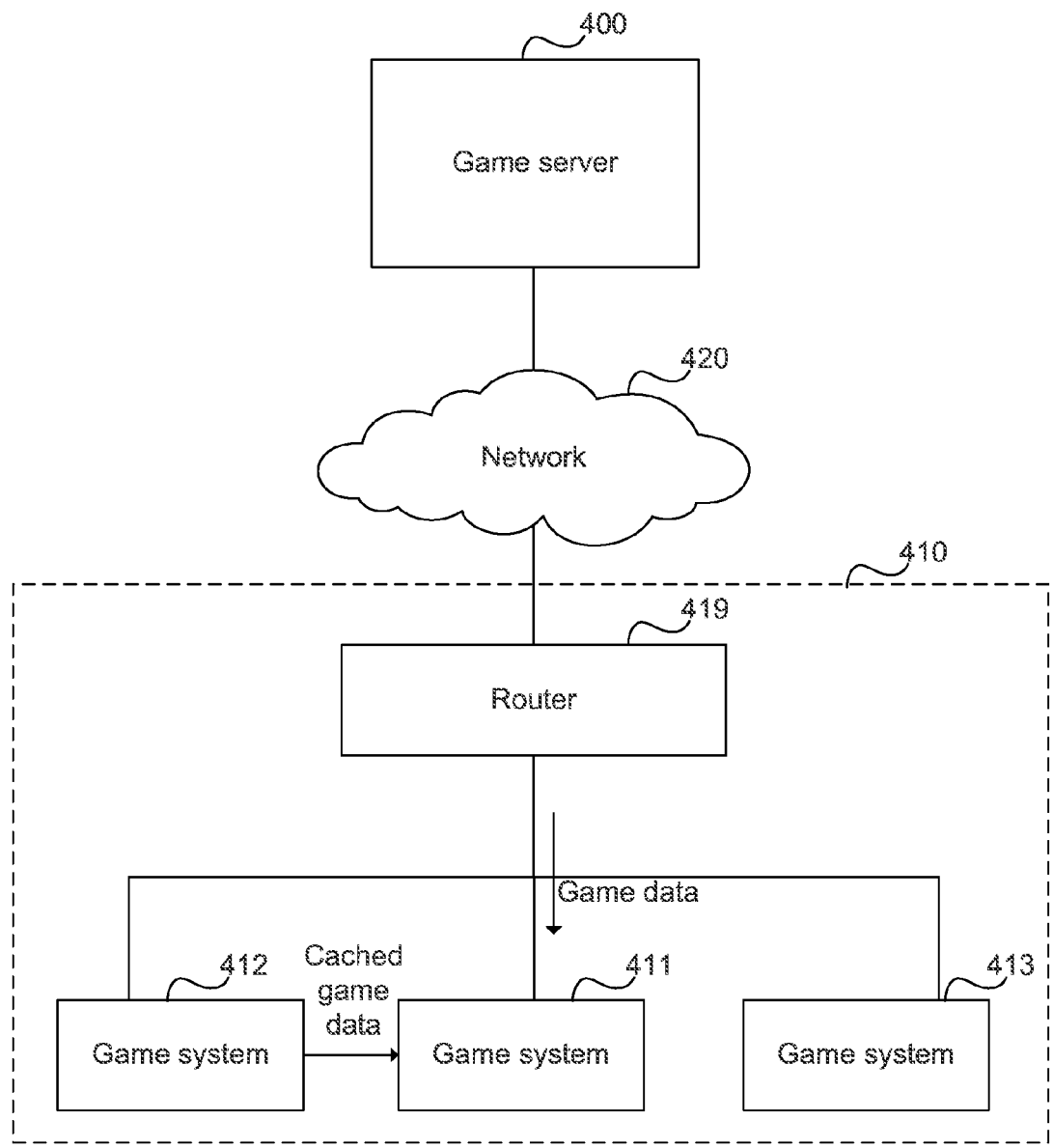
FIG. 4 illustrates an example of game systems connected to a cloud-based storage server.

The technology disclosed herein can be applied to various computing devices including, e.g., game systems or devices capable of running game applications. For instance, FIG. 4 illustrates an example of game systems connected to a cloud-based storage server. As depicted in FIG. 4, a game server 400 may provide a cloud-based game service to multiple game systems 411, 412 and 413 over a network 420. The network 420 can be, e.g., the Internet. The game systems 411, 412 and 413 form a local area network 410 by connecting to a router 419. Examples of game systems 411, 412 and 413 may include, but are not limited to, a mobile phone, a smartphone, a personal digital assistant (PDA), a tablet, a mobile game console, a laptop computer, a desktop computer, or any other devices having communication capability.

In some embodiments, game server 400 may monitor or measure resource usage or workload of the game systems. In some embodiments, the resource usage may be associated with resource usage of a central processing unit (CPU) of the game systems, resource usage of a graphic processing unit (GPU) of the game systems, resource usage of a main memory of the game systems, and/or resource usage of a graphic memory of the game systems, etc.

In some embodiments, game server 400 may determine or identify, among the game systems, one or more game systems as cache devices for other game systems in the local area network 410. The determination can be made based on, e.g., the work load of the game systems or the battery levels of the game systems. The game server 400 may identify a predetermined game event is about to happen in one game system, and instruct the cache devices to pre-cache the game data for the predetermined game event.

For instance, the game server 400 may identify that in game system 411, a predetermined game event of entering a new stage is about to happen. Examples of the predetermined game event may include, but are not limited to, starting a game by a player of the game, entering a new stage in the game by the player, entering a new place in the game by the player, completing a mission in the game by the player, obtaining a game item by the player, meeting another character in the game by the player, talking with another character in the game, occurrence of a scene change in the game, any other pre-defined game-related events or milestones, or even suspension of the game at a point intended to avoid disrupting the high quality experience for the user. The game server 400 can instruct the other game systems 412 and 413 to retrieve the game data for the new stage and store the game data as pre-cache for game system 411. When the game system 411 needs the game data for the new stage, the game system 411 first sends the request for the game data to the game server 400. The game server 400 responds to the game system 411 that game systems 412 and 413 have pre-cached the game data for the new stage. Therefore, the game system 411 can retrieve the game data from the game systems 412 and 413 within the same local area network 410.

Although FIG. 4 illustrates all devices in the local area network 410 as game systems, a person having ordinary skill in the art can readily understand that other types of device can be included in the local area network 410. For example, game systems 412 and 413 can be replaced with, e.g., tablets, smart phones or laptop computers, and still serve as cache devices for the game system 411.

Figure 5:
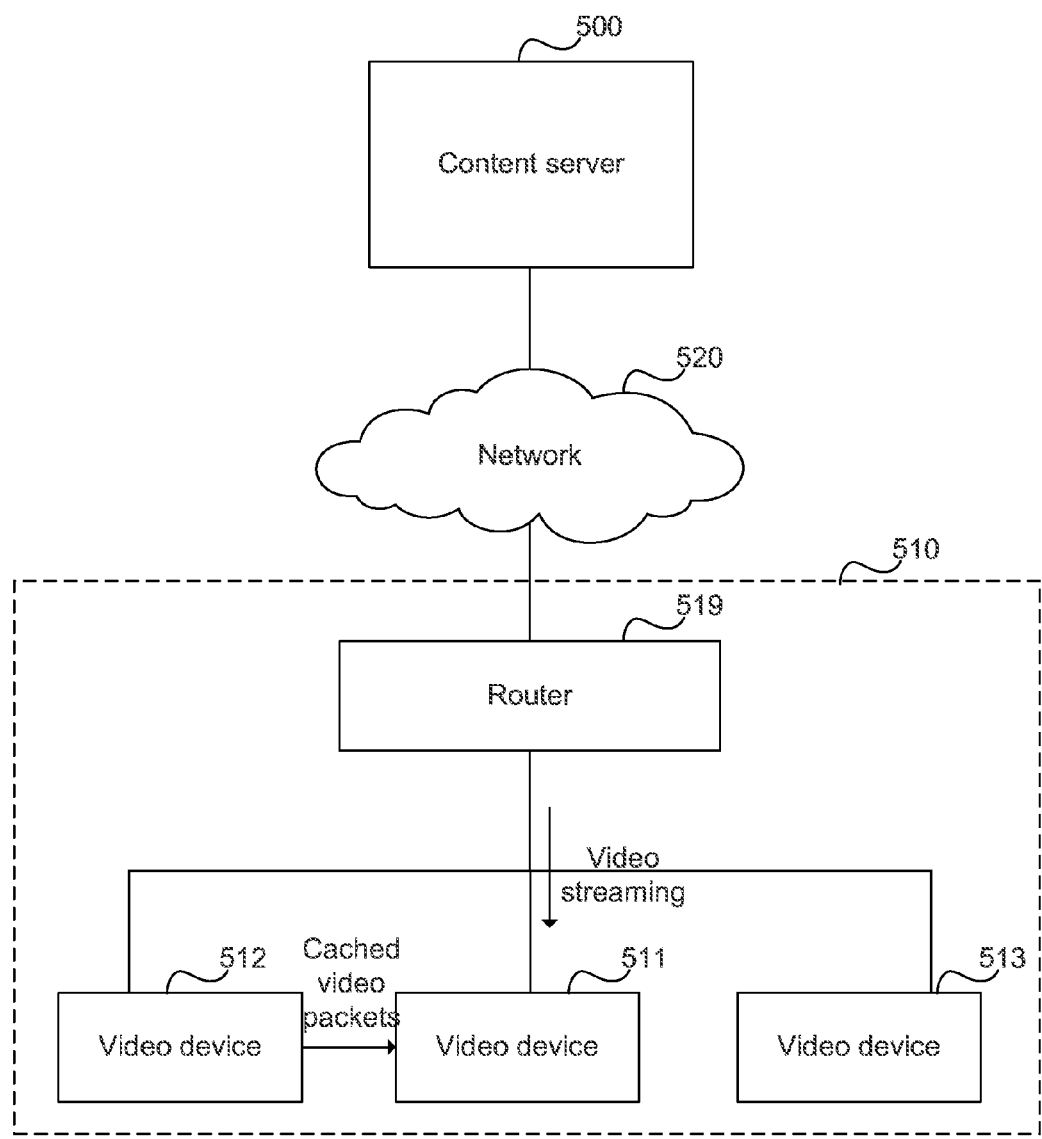
FIG. 5 illustrates an example of video streaming devices connected to a cloud-based content server.

Similarly, the technology disclosed herein can be applied to devices for steaming video or other types of data steaming. For instance, FIG. 5 illustrates an example of video streaming devices connected to a cloud-based content server. As depicted in FIG. 5, a content server 500 may provide a cloud-based video streaming service to multiple video devices 511, 512 and 513 over a network 520. The network 520 can be, e.g., the Internet. The video devices 511, 512 and 513 form a local area network 510 by connecting to a router 519. Examples of video devices 511, 512 and 513 may include, but are not limited to, a mobile phone, a smartphone, a personal digital assistant (PDA), a tablet, a mobile game console, a laptop computer, a desktop computer, or any other devices having communication capability.

The content server 500 can handle the video streaming request from any of the video devices 511, 512 and 513. The content server 500 can further monitor the network connection quality and/or streaming data rate of the video devices 511, 512 and 513. For example, if the content server 500 determines that the quality of a network connection between the content server 500 and the video device 511 is not good enough to sustain the video streaming to the video device 511, the content server 500 can instruct other device in the local area network, e.g. video devices 512 and 513, to serve as cache devices for the video device 511. The content server 500 can identify the video packets or video frames that are going to be sent to the device 511 for video streaming, and send the packets or frames to the cache devices 512 and 513. These cached video packets can be, e.g., video packets subsequent to the video packets that are being played currently in video device 511.

The content server 500 can notify the video device 511 of the cache devices 512 and 513. The network connection quality is high between the cached devices 512, 513 and the video device 511, since all these devices are in the same local area network. Therefore, instead of losing some of the video packets due to the network connection quality between the content sever 500 and the video device 511, the video device 511 can retrieve the cached video packets from the neighbor devices 512 and 513 (i.e. devices sharing the same local area network), in order to receive the video at a download rate fast enough to play the video stream without delays.

Although FIG. 5 illustrates devices for video streaming, a person having ordinary skill in the art can readily understand that the technology can be applied to other types of data streaming. For instance, the device 511 can use neighbor devices to cache data for audio streaming or application data streaming.

Figure 6:
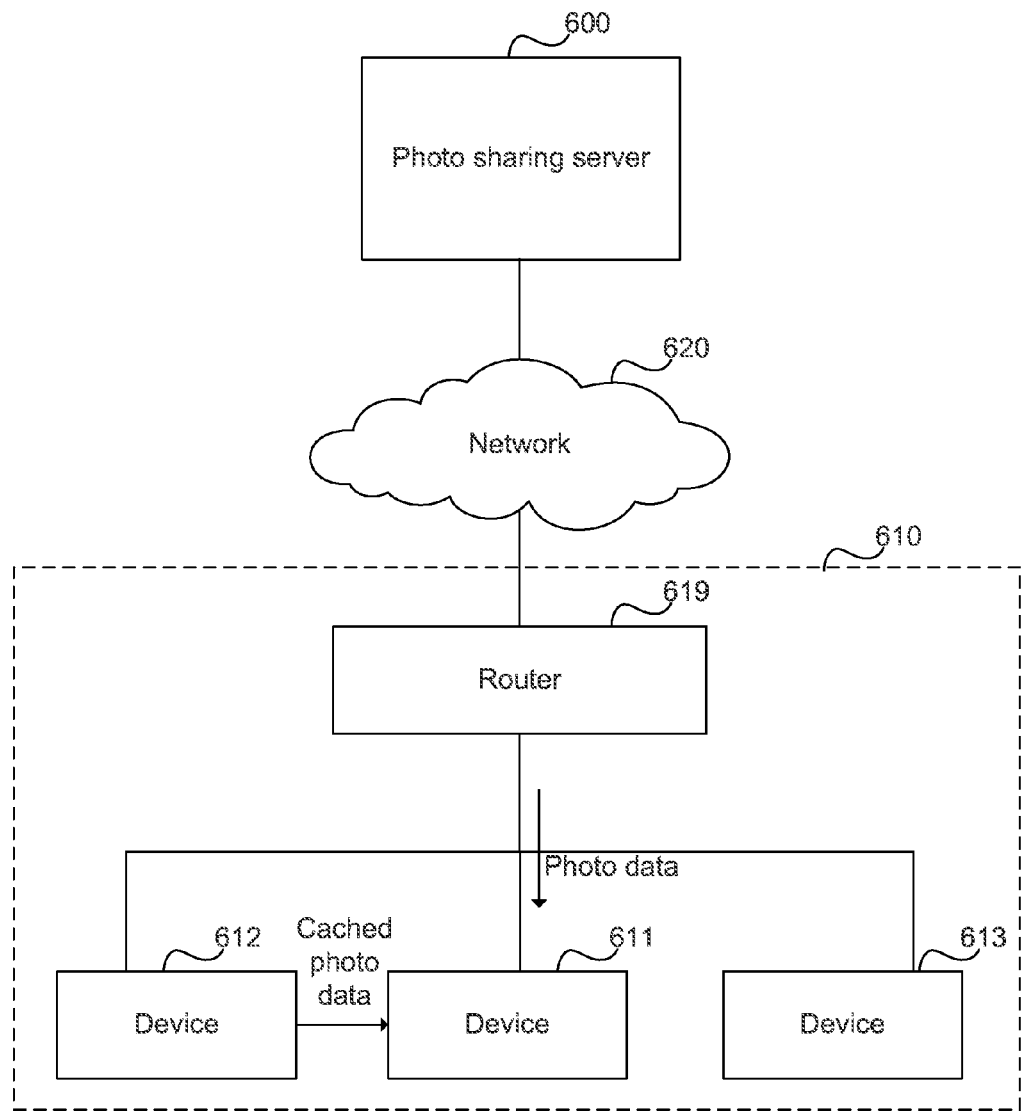
FIG. 6 illustrates an example of devices connected to a cloud-based photo sharing server

The technology disclosed herein can also be applied to devices for sharing photos or other types of data. For instance, FIG. 6 illustrates an example of devices connected to a photo sharing storage server. As depicted in FIG. 6, a photo sharing server 600 may provide a cloud-based photo sharing service to multiple computing devices 611, 612 and 613 over a network 620. The devices 611, 612 and 613 form a local area network 610 by connecting to a router 619. Examples of devices 611, 612 and 613 may include, but are not limited to, a mobile phone, a smartphone, a personal digital assistant (PDA), a tablet, a mobile game console, a laptop computer, a desktop computer, or any other devices with communication capabilities.

The photo sharing server 600 can handle the photo request from any of the devices 611, 612 and 613. The photo sharing server 600 can further monitor the activities of the devices 611, 612 and 613. For example, the photo sharing server 600 may determine that the device 611 is downloading a first couple previews of photos of a photo album. A photo album can include photo files in a directory, or include photo files with the same album metadata or id number. The device 611 may download the first couple previews to visualize the previews sequentially as a slide show. The photo sharing server 600 predicts that the device 611 will likely further download the rest of photo previews of the same photo album, as the device 611 likely will finish the slide show with all photo previews of the album. The photo sharing server 600 identifies that the devices 612 and 613 share the same local area network with the device 611. The photo sharing server 600 instructs the devices 612 and 613 to download and store the rest of the photo previews, and serve as cache devices for the device 611. When device 611 needs to download the photo previews to continue the slide show, the photo sharing server 600 can instruct the device 611 to download the photo previews from the cache devices 612 and 613. Since the cache devices 612 and 613 are in the local area network 610, the device 611 can retrieve the photo previews faster than retrieving them from the photo sharing server 600.

Additionally, the photo sharing server 600 may predict the device 611 will further download the original files of the photos being previewed, as a user of the device 611 may want to receive the original files to see the details of the photos or use the original files for making photo prints. Similarly, the photo sharing server 600 can transfer these original photo files to cache devices 612 and 613 to anticipate the needs of the device 611. When device 611 makes a request for an original photo file, it is redirected to the cache device 612 or 613 for retrieving the original photo file within the local area network 610.

Figure 7:
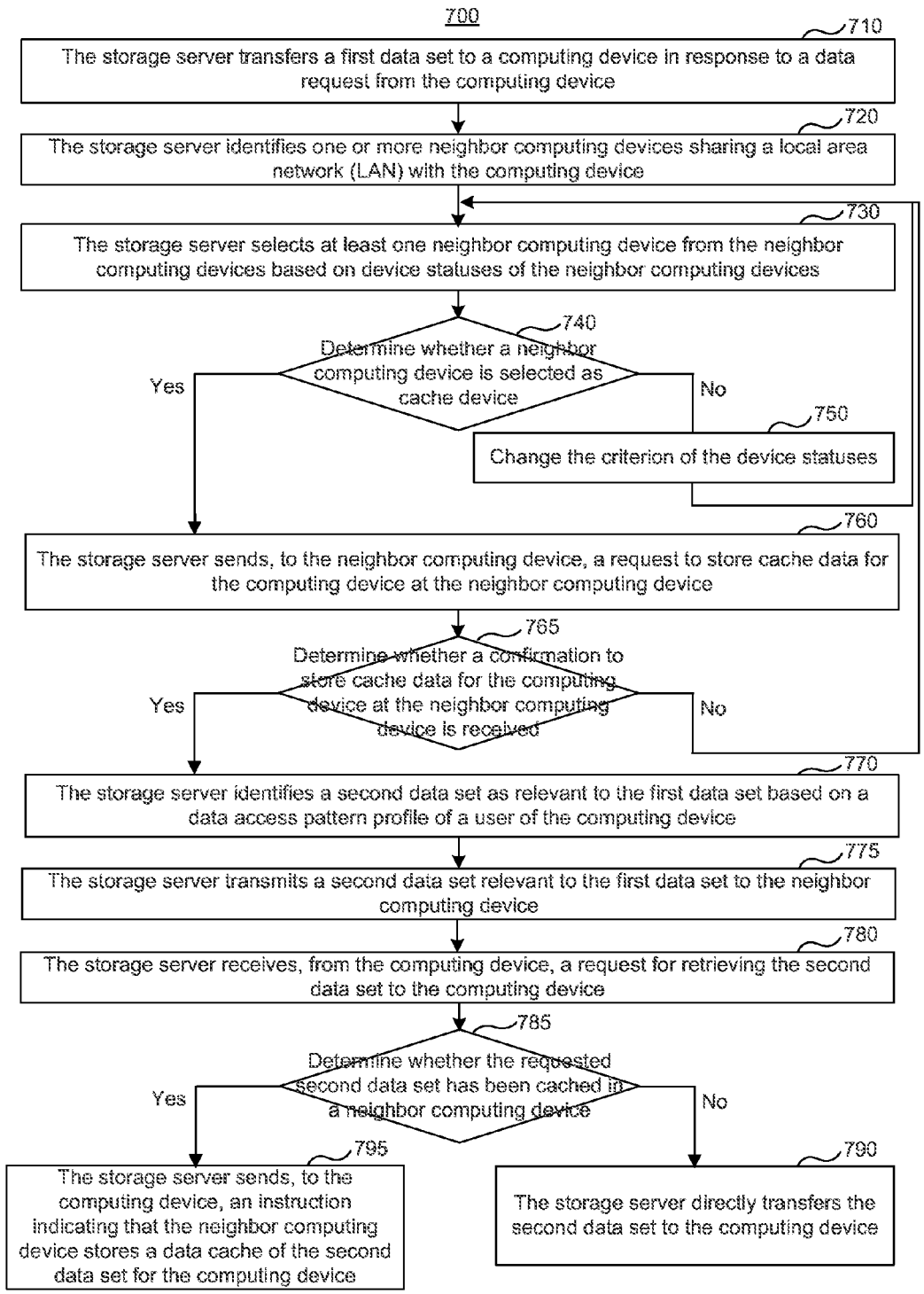
FIG. 7 illustrates an example of a process for caching data among multiple interconnected computing device

As illustrated in the figures, computing devices communicate with the cloud storage server to receive information regarding cache devices within the same local area network. The cloud storage server acts as a control center for assigning cache device responsibilities and directing devices to the cached locations. FIG. 7 illustrates an example of a process 700 for caching data among multiple interconnected computing devices. The process 700 starts at step 710, where the storage server transfers a first data set to a computing device in response to a data request from the computing device.

At step 720, the storage server identifies one or more neighbor computing devices sharing a local area network (LAN) with the computing device, wherein the neighbor computing devices maintain network connections with the storage server. For instance, the neighbor computing devices can maintain the network connections with the storage server via a router. The router controls the routing of all communications within the local area network as well as communications between the devices and the storage server. The bandwidth of the local area network interconnecting the computing device and the neighbor computing device can be higher than the bandwidth of a network connection between the computing device and the storage server.

At step 730, the storage server selects at least one neighbor computing device from the neighbor computing devices based on device statuses of the neighbor computing devices. The device statuses can include, e.g., battery levels of the neighbor computing devices, workloads of the neighbor computing devices, data transferring rates of network adapters of the neighbor computing devices, free storage available on the neighbor computing devices, ownerships of the neighbor computing devices, or other types of statuses of the computing devices.

At step 740, the storage server determines whether a neighbor computing device is selected as cache device. If no neighbor computing device is selected, the process 700 may, e.g., make changes to the criteria in which device statuses are reviewed at step 750 and repeats the step 730.

If a neighbor computing device is selected, at step 760, the storage server sends, to the neighbor computing device, a request to store cache data for the computing device at the neighbor computing device. At step 765, the storage server determines whether a confirmation to store cache data for the computing device at the neighbor computing device is received from the neighbor computing device. If the confirmation is not received, the process 700 can go to step 730 to select another neighbor computing device. Alternatively, the process storage server can continue to wait for the confirmation.

If the confirmation is received, at step 770, the storage server identifies a second data set as relevant to the first data set based on a data access pattern profile of a user of the computing device. The types of data sets can vary, and the relevance between the first and second data sets can vary as well. For instance, the first data set and the second data set can be two sets of data blocks that belong to a single file. These two data sets (data blocks) are relevant because they belong to the same file. Alternatively, the first data set can include a first file, and the second data set can include a second file sharing a common file property with the first file. The common property can be, e.g., file type, owner account, file access rights, file create timestamp, file modify timestamp, file metadata or other types of file properties. In some embodiments, the common property is not related to file metadata. For instance, the common property can be a data access pattern. In other words, a second data set can be related to a first data set in regards to data access patterns. In some embodiments, the first data set and the second data set are originally stored in the storage server and belong to a user account having access to both the computing device and neighbor computing device.

At step 775, the storage server transmits a second data set relevant to the first data set to the neighbor computing device. The neighbor computing device stores the second data set as cached data for the computing device. At step 780, the storage server receives, from the computing device, a request to retrieve the second data set and send it to the computing device.

At step 785, the storage server determines whether the requested second data set has been cached in a neighbor computing device sharing the local area network with the computing device. If the second data set has not been cached, the storage server directly transfers the second data set to the computing device at step 790. If the second data set has been cached, at step 795, the storage server sends, to the computing device, an instruction indicating that the neighbor computing device stored a data cache of the second data set for the computing device. The computing device in turn can retrieve the cached data set from the neighbor computing device.

Those skilled in the art will appreciate that the logic illustrated in FIG. 7 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the process 700 may identify and select a neighbor computing device as a cache device before sending any data sets to the computing device.

Figure 8:
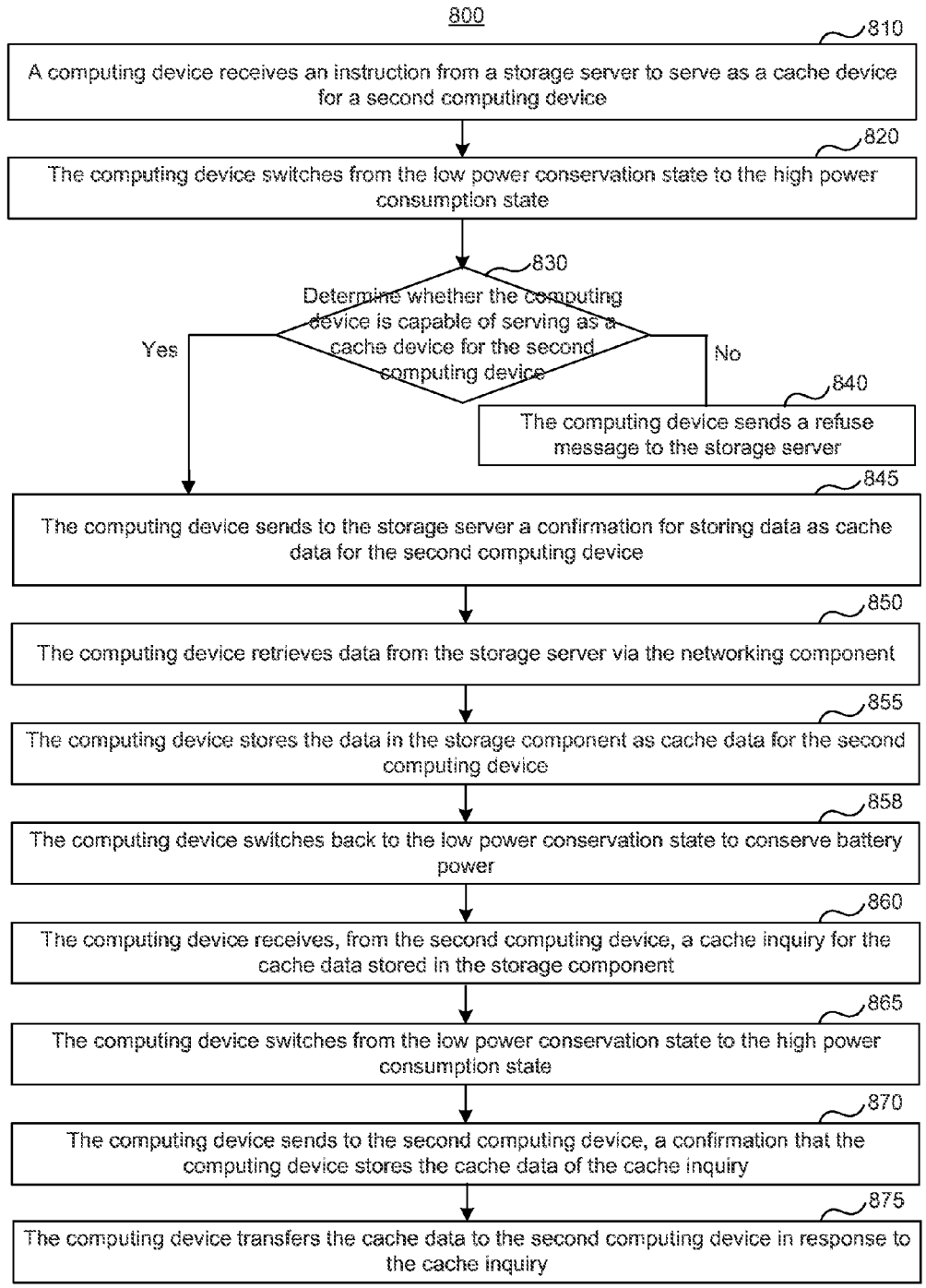
FIG. 8 illustrates an example of a process for caching data for computing devices in a local area network.

The computing devices within a local area network can serve as cache devices for each other. FIG. 8 illustrates an example of a process 800 for caching data for computing devices in a local area network. The process 800 starts at step 810, where a computing device receives an instruction from a storage server to serve as a cache device for a second computing device. The computing device can communicate with the second computing device via a networking component of the computing device. The computing device and the second computing device are interconnected by a router or switch in a local area network (LAN). The network component can further communicate with the storage server outside of the LAN. The LAN can be a high-speed local area network; and the networking component can connect with the storage server via the Internet. The storage server can be a cloud storage service.

The computing device may switch between a low power conservation state and a high power consumption state. For instance, at step 820, in response to a request from the storage server for storing data as cache data for the second computing device, the computing device can switch from the low power conservation state to the high power consumption state. At step 830, the computing device determines whether the computing device is capable of serving as a cache device for the second computing device. The determination can be based on the status of the computing device, as well as the network connection status between the storage server and the second computing device. For example, if the computing device's current workload is high, the computing device may refuse the request to serve as a cache device from the storage server. Alternatively, if the network connection speed between the computing device and the storage server is low (e.g., due to a problem with the networking component of the computing device), the computing device may refuse the request as well.

At step 840, if the computing device determines that computing device is not capable of serving as a cache device for the second computing device, the computing device sends a refuse message to the storage server. Otherwise, at step 845, the computing device sends to the storage server a confirmation for storing data as cache data for the second computing device. At step 850, the computing device retrieves data from the storage server via the networking component. At step 855, the computing device stores the data in the storage component as cache data for the second computing device. Once the data is cached, at step 858, the computing device may switch back to the low power conservation state to conserve battery power. The computing device and the second computing device may be personal electronic devices to which a user has access.

At step 860, the computing device receives, from the second computing device, a cache inquiry for the cache data stored in the storage component. In response to the cache inquiry from the second computing device, at step 865, the computing device switches from the low power conservation state to the high power consumption state. At step 870, the computing device sends to the second computing device, a confirmation that the computing device has stored the cache data of the cache inquiry. At step 875, the computing device transfers the cache data to the second computing device in response to the cache inquiry.

Figure 9:
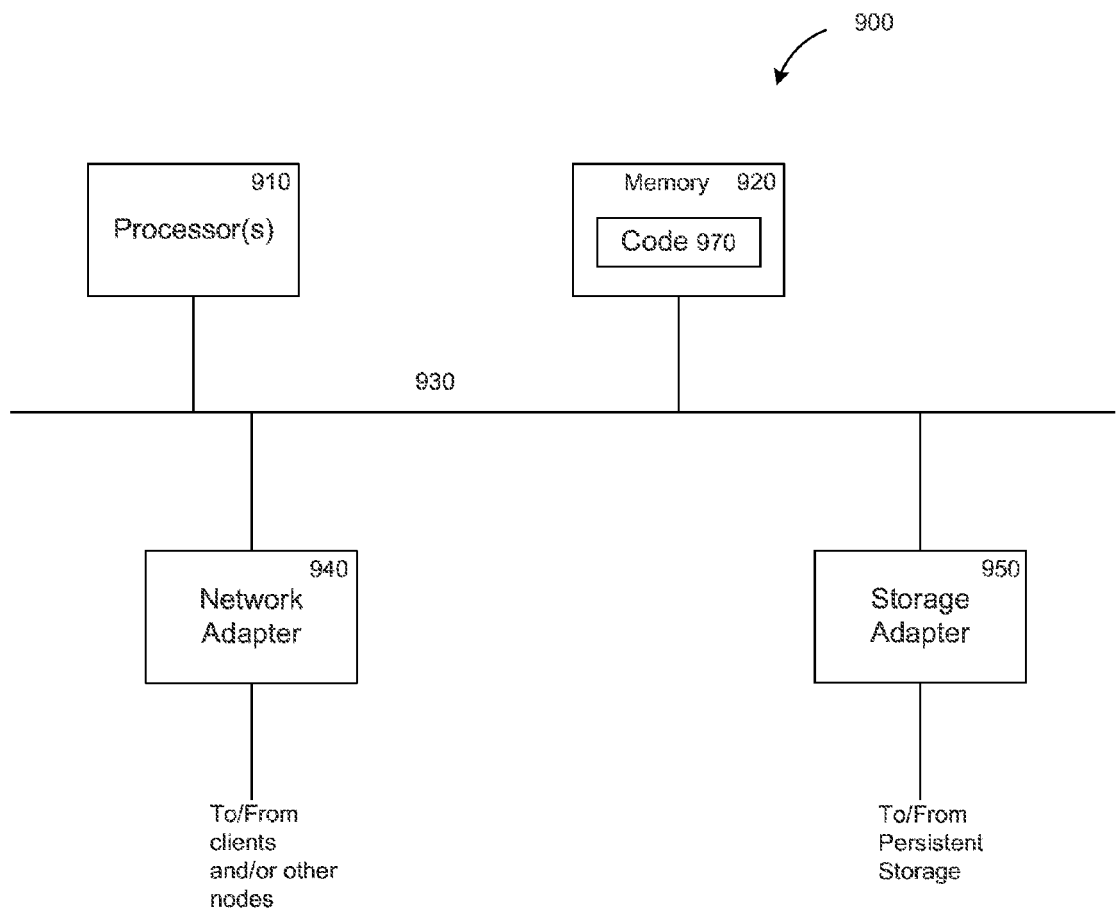
FIG. 9 is a high-level block diagram showing an example of the architecture of a computer, which may represent any computing device or server described herein.

FIG. 9 is a high-level block diagram showing an example of the architecture of a computer 900, which may represent any computing device or server described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain a code 970 containing instructions according to the technology disclosed herein.

Also connected to the processor(s) 910 through the interconnect 930 are a network adapter 940 and a storage adapter 950. The network adapter 940 provides the computer 900 with the ability to communicate with remote devices, over a network and may be, for example, an Ethernet adapter or Fibre Channel adapter. The network adapter 940 may also provide the computer 900 with the ability to communicate with other computers. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for caching data among multiple interconnected computing devices, comprising:
   transferring, from a storage server, a first data set to a computing device;
   identifying, at the storage server, a neighbor computing device from multiple neighboring computing devices sharing a local area network (LAN) with the computing device, the neighbor computing device being selected from the multiple neighbor computing devices based on device statuses of the multiple neighbor computing devices, the device statuses including battery levels of the multiple neighbor computing devices, wherein the multiple neighbor computing devices maintain a network connection with the storage server, wherein identifying the neighbor computing device further includes:
   sending, from the storage server, a request to the neighbor computing device to store cache data for the computing device at the neighbor computing device;
   determining, at the storage server, whether a confirmation to store the cache data for the computing device at the neighbor computing device is received, wherein the storage server reinitiates identification of another neighbor computing device sharing the LAN with the computing device upon failing to receive confirmation from the neighbor computing device; and
   receiving, at the storage server, a confirmation from the neighbor computing device to store the cache data for the computing device at the neighbor computing device when the neighbor computing device is able to store the cache data;
   identifying, at the storage server, a second data set as relevant to the transferred first data set;
   transmitting, from the storage server, the identified second data set to the identified neighbor computing device; and
   upon transmitting the second data set to the identified neighbor computing device, sending, from the storage server, an instruction to the computing device, the instruction indicating that the identified neighbor computing device stores a data cache for the computing device.

2. The method of claim 1, wherein a bandwidth of the local area network interconnecting the computing device and the neighbor computing device is higher than a bandwidth of a network connection between the computing device and the storage server.

3. The method of claim 1, wherein identifying, at the storage server, the second data set as relevant to the first data set is based on a data access pattern profile of at least one user of the computing device.

4. The method of claim 1, wherein the first data set and the second data set are two sets of data blocks that belong to a file.

5. The method of claim 1, wherein the first data set includes a first file, and the second data set includes a second file sharing a common property with the first file.

6. The method of claim 5, wherein the common property is file type, owner account, file access right, file create timestamp, file modify timestamp, or file metadata.

7. The method of claim 1, wherein the device statuses further includes one or more of workloads of the neighbor computing devices, data transferring rates of network adapters of the neighbor computing devices, free storage available on the neighbor computing devices or ownerships of the neighbor computing devices.

8. The method of claim 1, wherein the first data set and the second data set are stored in the storage sever and belong to a user account having access to the computing device and neighbor computing device.

9. The method of claim 1, further comprising:
receiving, from the computing device, a request for retrieving the second data set and sending it to the neighbor computing device.

10. A computing device comprising:
a networking component configured to communicate with a second computing device, wherein the computing device and the second computing device are interconnected within a local area network (LAN), the network component further configured to communicate with a storage server outside of the LAN;
a storage component;
a processor; and
a memory storing instructions which, when executed by the processor, cause the computing device to perform a process including:
receiving, from the storage server, a request to store cache data for the second computing device at the computing device, wherein the computing device is selected by the storage server to store the cache data based on a battery level of the computing device;
sending, to the storage server, a refusal to store the cache data for the second computing device at the computing device when the computing device is unable to store the cache data; and
sending a confirmation to the storage server to store the cache data for the second computing device at the computing device when the computing device is able to store the cache data, wherein the storage server reinitiates identification of another computing device sharing the LAN with the second computing device upon failing to receive confirmation from the computing device;
retrieving data from the storage server via the networking component;
storing the data in the storage component as cache data for the second computing device;
receiving, from the second computing device, a cache inquiry for the cache data stored in the storage component; and
in response to the cache inquiry, transferring the cache data to the second computing device.

11. The computing device of claim 10, wherein the LAN is a high-speed local area network, and a networking component connects with the storage server via the Internet.

12. The computing device of claim 10, wherein the storage server is a cloud storage service.

13. The computing device of claim 10, wherein the computing device and the second computing device are personal electronic devices to which a user has access.

14. The computing device of claim 10, wherein the computing device can switch between a low power conservation state and a high power consumption state.

15. The computing device of claim 14, wherein the process further includes:
in response to a request from the storage server for storing data as cache data for the second computing device, switching the computing device from the low power conservation state to the high power consumption state; and
sending to the storage server a confirmation for storing data as cache data for the second computing device.

16. The computing device of claim 14, wherein the process further includes:
in response to the cache inquiry from the second computing device, switching the computing device from the low power conservation state to the high power consumption state; and
sending to the second computing device, a confirmation that the computing device is storing the cache data of the cache inquiry.

17. A storage server comprising:
a networking component configured to communicate with a first computing device;
a storage component;
a processor; and
a memory component storing instructions which, when executed by the processor, cause the storage server to perform a process including:
in response to a read request for a first data set from the first computing device, transferring the first data set stored in the storage component to the first computing device;
identifying a second data set relevant to the first data set;
identifying a neighbor computing device from multiple neighbor computing devices sharing a local area network (LAN) with the first computing device, the neighbor computing device being selected from the multiple neighbor computing devices based on device statuses of the multiple neighbor computing devices, the device statuses including a battery level of the multiple neighbor computing devices, wherein the multiple neighbor computing devices maintain a network connection with the storage server, wherein identifying the neighbor computing device further includes:
sending a request to the neighbor computing device to store cache data for the first computing device at the neighbor computing device;
determining whether a confirmation to store the cache data for the first computing device at the neighbor computing device is received, wherein the storage server reinitiates identification of another neighbor computing device sharing the LAN with the first computing device upon failing to receive confirmation from the neighbor computing device; and
receiving a confirmation from the neighbor computing device to store the cache data for the computing device at the neighbor computing device when the neighbor computing device is able to store the cache data;
transferring the second data set to the neighbor computing device as cache data for the first computing device; and in response to a read request for the second data set from the first computing device, sending an instruction to the first computing device to retrieve the second data set directly from the neighbor computing device.

18. The storage server of claim 17, wherein the neighbor computing device serves as a data cache device for the first computing device.

* * * * *